June 3, 1952   W. B. ELMER   2,598,772
LAMP LEAD INSULATOR
Filed Jan. 12, 1950   2 SHEETS—SHEET 2

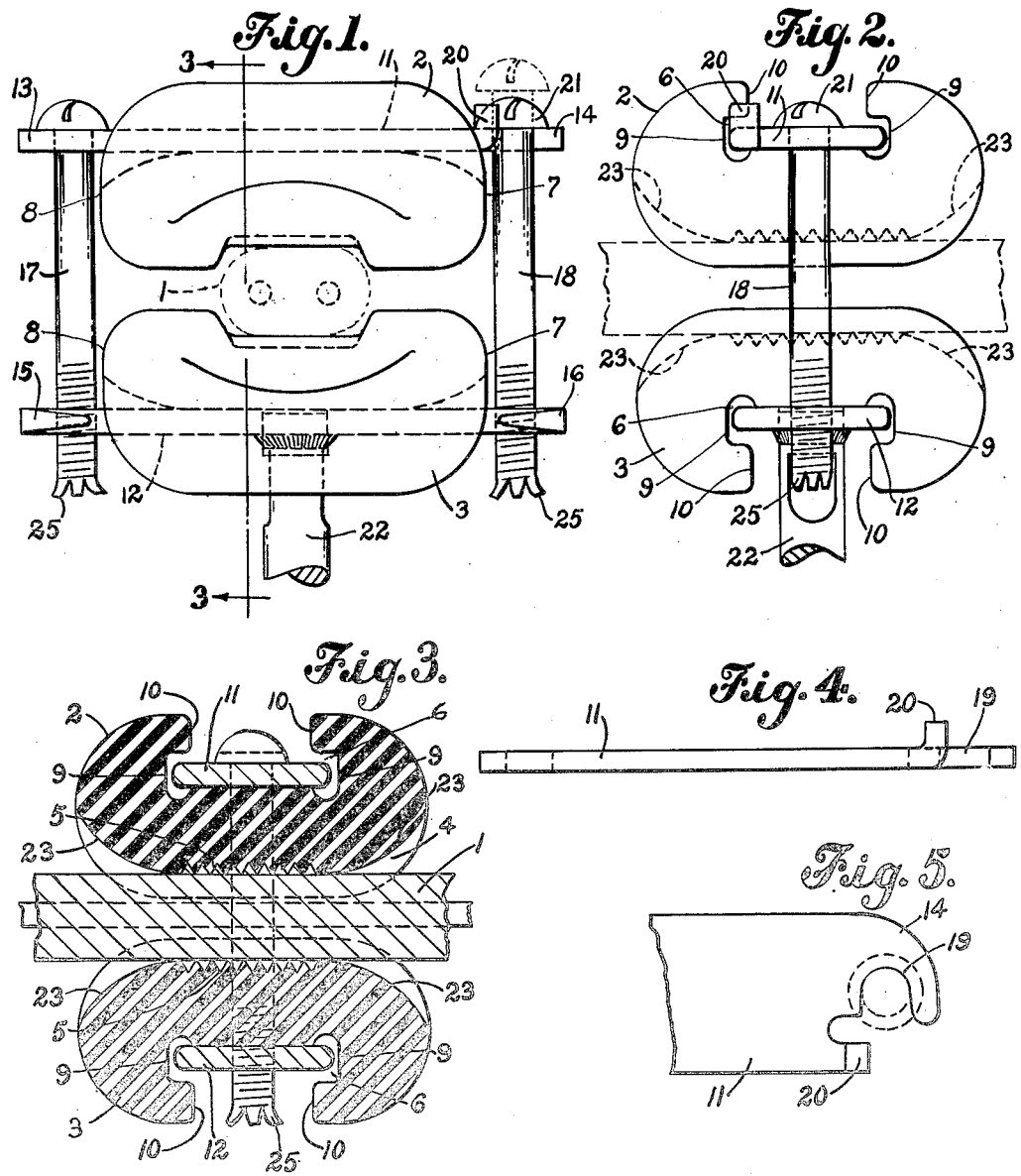

INVENTOR.
William B Elmer
BY
Heard Smith Tennant
Attorneys

Patented June 3, 1952

2,598,772

UNITED STATES PATENT OFFICE 2,598,772

LAMP LEAD INSULATOR

William B. Elmer, Boston, Mass., assignor to Wheeler Reflector Company, Boston, Mass., a corporation of Massachusetts Application January 12, 1950, Serial No. 138,159

2 Claims. (Cl. 174—154)

This invention relates to insulators for the lead cables of outdoor electric light fixtures or other devices which are to be supplied with electrical current.

One type of insulator for this purpose which is now commonly used is in the form of a one-piece member of insulating material having a hole therethrough through which the lead cable is threaded, said insulator being secured to the cable by means of friction tape, or other similar attaching means, the insulator, of course, being provided with usual means for attachment to a pole or to some other convenient or suitable support.

In installing insulators of this type it is necessary to thread a long length of cable through the aperture of each insulator, which, of itself, is a time-consuming operation. Moreover, the friction tape, or other attaching means of this type, deteriorates after it has been in use for some time and when this happens the lead cable will not be properly secured or attached to the insulator.

It is one of the objects of my invention to provide a novel insulator for lead cables which insulator functions both to insulate the cable properly and to clamp it firmly in position without the use of friction tape, or other similar means for securing the cable to the insulator.

A further object of the invention is to provide a novel insulator for the above purpose which is made in two sections between which the cable can be clamped, said sections being so connected that they can be readily separated from each other sufficiently to allow the cable to be introduced between them by a relative movement of the cable and the insulator in a direction at an angle to the length of the cable.

A further object of the invention is to provide an insulator of the above type, which is so constructed that when the clamping screws are loosened for the purpose of separating the two sections sufficiently to introduce the cable between them, all the parts of the insulator will remain connected together, so that no individual part can become entirely separated from the other parts. This is of some advantage because when a lineman is installing an insulator embodying this invention on a lead cable at some distance above the ground, he has the assurance that in manipulating the cable and the insulator during the installation process none of the parts of the insulator will become detached from the other parts and possibly drop to the ground.

In order to give an understanding of the invention, I have illustrated in the drawings a selected embodiment thereof which will now be described, after which the novel features will be pointed out in the appended claims.

In the drawings,

Fig. 1 is an end view of an insulator embodying my invention;

Fig. 2 is a side view thereof;

Fig. 3 is a section on the line 3—3 Fig. 1;

Fig. 4 is an edge view of the clamping plate which is used in clamping the sections of the insulator to the cable;

Fig. 5 is a plan view of one end of the clamping plate shown in Fig. 4;

Figure 6:
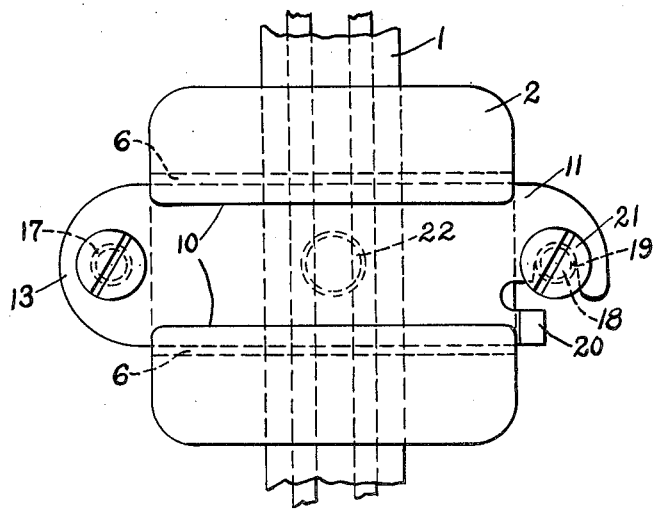
Fig. 6 is a plan view of the clamping insulator.

In the drawings 1 indicates a portion of a lead cable with which my improved insulator is designed to be used.

The insulator includes the two sections or insulator members 2 and 3 which are made of suitable insulating material and which are preferably identical in shape and size. Each member of the insulator is formed on its inner face with a cable-receiving groove 4 in which the cable 1 is received, and preferably the bottom of each groove 4 is provided with a serrated surface, as indicated at 5, in order that each insulator member may have an increased clamping engagement on the cable 1.

Each insulator member is also provided on its back face with a groove 6 which extends from one side 7 to the other side 8 thereof, said groove 6, therefore, being situated at right angles to the groove 4.

The distance between the portion 9 of the side walls of each groove 6 at the bottom of the groove is greater than the distance between the portions 10 of the side walls of the groove at the mouth thereof, said groove 6, therefore, being wider at its bottom than at the mouth. Each groove 6 is therefore in the nature of a dove-tail groove.

Each groove 6 receives a straight clamping plate which extends the length of the groove and projects beyond the sides of the insulator member. The clamping plate in the groove 6 of the insulator member 2 is indicated at 11 and the clamping plate in the groove 6 of the insulator member 3 is indicated at 12. The two clamping plates 11 and 12 have a substantially parallel relation and the clamping plate 12 is shown as having a stem 22 extending therefrom by which the insulator assembly may be secured to a post or some other suitable support.

As stated above, the clamping plates 11 and 12 are straight and extend beyond the sides 7 and 8 of the insulator members as indicated at 13, 14, 15, and 16, and hence the extended end portions of one clamping plate are widely spaced from the corresponding extended end portions of the other clamping plate. The extended ends of the clamping plates are connected by means of clamping screws 17 and 18.

Each clamping plate is wider than the mouth of the groove 6 in which it is located, so that said clamping plate can only be introduced into or removed from the groove by an end-wise movement.

The end 13 of the clamping plate 11 has an untapped hole through which the clamping screw 17 extends and the corresponding end 15 of the clamping plate 12 has a tapped hole into which the end of said clamping screw is screw threaded. The end 14 of the clamping plate 11 is also provided with an opening through which the clamping screw 18 extends and the end 16 of the clamping plate 12 has a tapped hole into which the end of said clamping screw 18 is screw threaded. The lower ends of the clamping screws are staked to prevent removal of the clamping screws after the parts have once been assembled, as shown at 25.

The connection between the end 14 of the clamping plate 11 and the clamping screw 18 is such that by backing off the clamping screw 18 for a slight distance such screw can be readily disconnected from the end 14 of the clamping plate 11. When such disconnection has been made the insulator member 2 with its clamping plate 11 can be swung about the clamping screw 17 into an open position, as shown in Fig. 7, thereby separating the two insulator members sufficiently to permit the cable 1 to be placed in or removed from the groove 4 of the clamping member 3 as also shown in Fig. 7.

For this purpose, the end 14 of the clamping plate 11 is made with an open end slot 19 in which the shank of the clamping screw 18 is received when the parts are in cable-clamping position as seen in Figs. 1, 2, and 6, such open slot permitting said clamping plate 11 with the insulator member 2 to be swung into open position as above described when the clamping screw 18 has been sufficiently loosened.

The construction is also such that when the insulator member 2 has thus been swung into open position it cannot slide off from the free end 14 of the clamping plate, but it, and the clamping plate will be retained in their proper operative relative positions. For this purpose the end 14 of the clamping plate 11 is formed with an upstanding lug 20 which engages the end of the insulator member 2 and prevents it from sliding off from the end 14 of the clamping plate 11. This lug 20 also serves to prevent the screw 18 from becoming disengaged from the slot 19 after it had been tightened to clamp the cable between the insulator members. It will be noted that the lug 20 is so positioned that it stands in front of the head 21 of the screw 18 when the latter is tightened, as best seen in Figs. 1 and 2, and thereby locks the screw in the slot 19. The screw can only be disengaged from the slot after it has been backed off a sufficient distance to raise its head 21 above the lug 20, as shown in dotted lines, Fig. 1.

Figure 7:
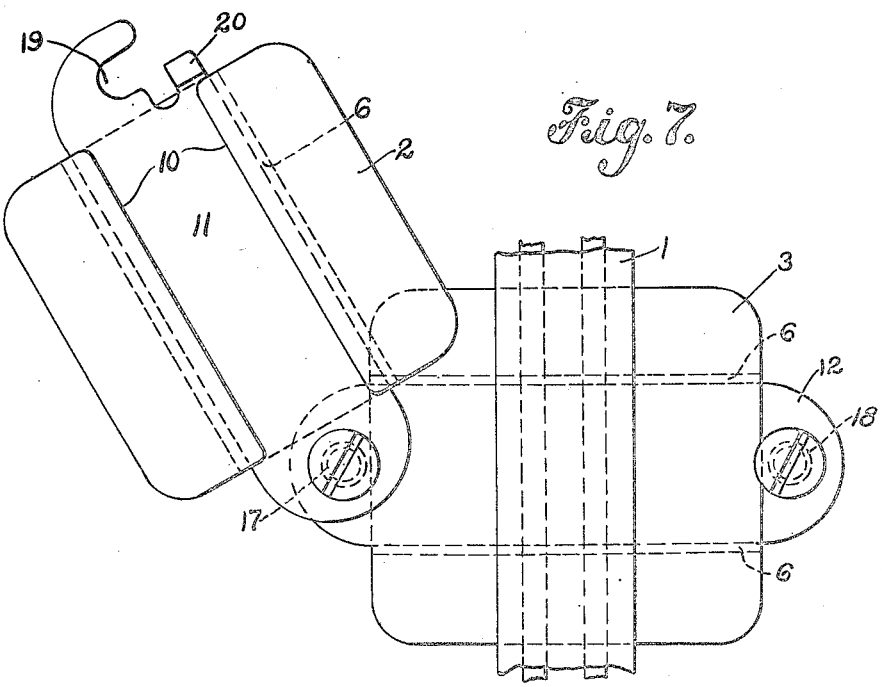
Fig. 7 is a plan view showing the insulator member swung into an open position, which is the position in which it is placed when the insulator is being installed on a cable.

When the screw has thus been backed off the insulator member 2 can be swung about the clamping screw 17 to carry the two members into the relative position shown in Fig. 7, in which position said members are sufficiently separated to permit the cable 1 to be introduced into position between them or to be removed from them.

In installing the clamp on a cable 1 the two members will be moved into the relative position shown in Fig. 7 and after the cable has been placed between them and has been laid in the groove 4 of the member 3, the member 2 will be swung back into its operative position, during which movement the upper end of the clamping screw 18 will enter into the slot 19. After this has been done the clamping screws are tightened to clamp the two insulating members firmly to the cable, and during this operation the head 21 of the screw 18 will be brought into the full line position Fig. 1, in which position the lug 20 locks said clamping screw 18 in the slot 19.

The construction of the device is such that even when the clamping screw 18 has been disengaged from the slot 19 and the two insulator members have been swung into open position, as shown in Fig. 7, the various parts will still be connected together in such a way that they can not readily be separated so that when, for instance, a lineman is installing the insulator on a cable 1 he can manipulate the parts to bring the two insulator members into their operative positions without any danger that any of the parts will become separated from other parts.

The fact that the lower end of each clamping screw 17 and 18 is staked, as shown at 25, prevents the screws from being removed from the clamping plate 12 and therefore when the insulator sections are opened away from each other the clamping plates 11 and 12 will still remain connected by the clamping screw 17.

Furthermore, the lug 20 cooperates with the clamping member 2 to prevent it from sliding off from the clamping plate 11 when the parts are in the position shown in Fig. 7 and since the groove 6 which the clamping plates 10 and 11 occupy are in the nature of dove-tail grooves the clamping members cannot be disengaged from the clamping plates except by a relative movement of each clamping member and its clamping plate in a direction longitudinally of the plate.

Therefore, when the insulator members, clamping plates and clamping screws are once assembled they will remain assembled even after the insulator members have been swung into their open position.

The cable-receiving slot in each insulator member is formed at each end with the curved surface 23, the purpose of which surfaces is to prevent any sharp bending of the cable 1 closely adjacent the point where it is gripped between the insulator members.

I claim:

1. A lamp lead insulator clamp comprising two insulator members each having in one side a cable-receiving groove extending from one end to the other thereof and in the opposite side a second groove extending at right angles to the cable-receiving groove, said second groove being wider at its bottom than at its mouth, a straight clamping plate occupying the second groove of each insulator member, each clamping plate being wider than the mouth of the groove it occupies and projecting at each end beyond the corresponding insulator member, said clamping plates having a substantially parallel relation, clamping screws connecting each projecting end of each clamping plate with the corresponding projecting end of the other clamping plate, the projecting portion at one end of one clamping plate having a transversely extending open ended slot to receive the corresponding clamping screw and through which said screw can be moved into and out of operative engagement with said clamping plate, the projecting portion of the clamping plate having a lug extending laterally therefrom and engaging the end of the corresponding insulator member, thereby to prevent said insulator member from movement relative to the clamping plate in a direction toward the slotted end thereof, whereby when the clamping screw is disengaged from the slot said insulator member will be prevented from slipping off from the clamping plate.

2. A lamp lead insulator clamp comprising two insulator members each having in one side a cable-receiving groove extending from one end to the other thereof and in the opposite side a second groove extending at right angles to the cable-receiving groove, said second groove being wider at its bottom than at its mouth, a straight clamping plate occupying the second groove of each insulator member, each clamping plate being wider than the mouth of the groove it occupies and projecting at each end beyond the corresponding insulator member, said clamping plates having a substantially parallel relation, clamping screws connecting each projecting end of each clamping plate with the corresponding projecting end of the other clamping plate, one projecting end of one clamping plate having an open ended slot extending transversely thereof to receive the corresponding clamping screw and through which said screw can be moved into and out of operative engagement with said clamping plate, said projecting end having a lug extending transversely therefrom adjacent the open end of said slot and situated to engage the end of the corresponding insulator member and prevent it from movement relative to the clamping plate in a direction toward the slotted end thereof, and also to cooperate with the head of the clamping screw occupying said slot to retain said screw in the slot.

WILLIAM B. ELMER.

REFERENCES CITED

The following references are of record in the file of this patent:

UNITED STATES PATENTS

| Number | Name | Date |
|---|---|---|
| 947,094 | Burton | Jan. 18, 1910 |
| 1,788,245 | Manson | Jan. 6, 1931 |
| 1,992,284 | Banks | Feb. 26, 1935 |

FOREIGN PATENTS

| Number | Country | Date |
|---|---|---|
| 162,068 | Switzerland | June 15, 1933 |